(12) United States Patent
Amafuji et al.

(10) Patent No.: US 6,292,158 B1
(45) Date of Patent: Sep. 18, 2001

(54) DISPLAY SYSTEM

(75) Inventors: Hisashi Amafuji; Ryutaro Nasu; Yasuhiko Handa; Keizou Kumai, all of Kyoto; Yasuhiro Nakahara, Chofu, all of (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/070,810

(22) Filed: May 1, 1998

(30) Foreign Application Priority Data

May 8, 1997 (JP) .................................................. 9-135977
Aug. 25, 1997 (JP) .................................................. 9-244601

(51) Int. Cl.$^7$ ....................................................... G09G 5/00
(52) U.S. Cl. ........................ 345/7; 345/8; 345/9; 345/121
(58) Field of Search ................................. 345/7, 8, 9, 30, 345/112, 121, 126, 1, 2, 3

(56) References Cited

U.S. PATENT DOCUMENTS

| | | | |
|---|---|---|---|
| 5,585,813 | * 12/1996 | Howard | 35/8 |
| 5,781,165 | * 7/1998 | Tabata | 345/8 |
| 5,844,530 | * 12/1998 | Tosaki | 345/8 |
| 5,917,460 | * 6/1999 | Kadama | 345/8 |
| 5,959,597 | * 9/1999 | Yamada et al. | 345/8 |
| 6,046,712 | * 4/2000 | Beller et al. | 345/8 |
| 6,085,428 | * 7/2000 | Casby et al. | 33/286 |
| 6,137,457 | * 10/2000 | Tokuhashi et al. | 345/8 |
| 6,172,657 | * 1/2001 | Kamakura et al. | 345/8 |

FOREIGN PATENT DOCUMENTS 0 714 043   5/1996   (EP) .
96 07947    3/1996   (WO) .

OTHER PUBLICATIONS

B. A. Reichlen: "Sparcchair: A One Hundred Million Pixel Display", Sep. 18, 1993, Proceedings of the Virtual Reality Annual International Symposium, Seattle, Washington, Sep. 18–22, 1993, Nr. Symp. 1, pp. 300–307, Institute of Electrical and Electronics Engineers.

* cited by examiner

Primary Examiner—Richard Hjerpe
Assistant Examiner—Kevin M. Nguyen
(74) Attorney, Agent, or Firm—Arent Fox Kintner Plotkin & Kahn, PLLC (57) ABSTRACT

A display system detects the orientation of the image display screen of a movable display device, the image display screen of which can be arbitrarily oriented, and outputs image data stored and related with the detected orientation of the image display screen to the movable display device, to display image corresponding to the image data. The display system changes the orientation of the image display screen stored and related with the image data according to change in the orientation of the image display screen of the movable display device, when the image data is output to the movable display device and a change signal is output.

7 Claims, 8 Drawing Sheets

DISPLAY SYSTEM

FIELD OF THE INVENTION

The present invention relates to a display system suitable for simultaneously displaying a plurality of images corresponding to a plurality of tasks, which are being processed by a computer.

DESCRIPTION OF THE RELATED ART

When a multitasking computer is executing a plurality of programs, a plurality of working images corresponding to the programs are displayed on the screen like documents spread out on a desktop.

For example, when combining image made by a word processor and image made by a drawing program, it is desirable to display both images on the screen at the same time. In this case, a large screen display device is used because visibility is poor on a small screen display device.

However, a large screen display device requires a large amount of space. Also, displaying a plurality of images at the same time is difficult with a portable computer, such as a notebook computer with a small screen. For that reason, works requiring the concurrent display of a plurality of images is limited when the user is in a small space or outdoors.

It is an object of the present invention to provide a display system which can resolve the aforementioned problems.

SUMMARY OF THE INVENTION

The display system of the present invention comprises; a movable display device able to orient its image display screen in an arbitrary direction; means for storing image data with an orientation of the image display screen so that the image data is related with the orientation; means for detecting the orientation of the image display screen of the movable display device; means for outputting the image data, when the detected orientation of the image display screen corresponds to the orientation of the image display screen stored and related with the image data, to the movable display device so that an image corresponding to the image data is displayed; means for outputting a change signal; and means for changing the orientation of the image display screen stored and related with the image data according to the change in orientation of the image display screen of the movable display device, when the image data and the change signal are output.

In the constitution of the present invention, when the orientation of the image display screen of the movable display device is changed in a state where an image is displayed on the image display screen with one orientation and the change signal is output, the orientation of the image display screen stored and related with the image data corresponding to the displayed image is changed in the same way. In this case, the display position of the image is changed in accordance with the change in orientation of the image display screen of the movable display device. When the output of the change signal is canceled, the orientation of the image display screen stored and related with the image data is changed to the orientation of the image display screen of the movable display device at the time of the cancellation of the change signal. In a state where the change signal is not output, the image corresponding to the image data can be seen only where the orientation of the image display screen stored and related with that image data corresponds to the orientation of the image display screen of the movable display device. A desired image can thereby be displayed on the image display screen at an arbitrary orientation. To be more precise, in the state where the change signal is output, the same image can be displayed when the image display screen is oriented in one direction and when it is oriented in a different direction. While, in the state where the output of the change signal is canceled, mutually different images can be displayed when the image display screen is oriented in one direction and when it is oriented in a different direction.

It is preferable that the display system of the present invention comprises; a standard display device; and means for determining whether the angle, which is formed by the orientation of the image display screen of the movable display device relative to a predetermined standard direction, is within a given angle; wherein, when the angle formed by the orientation of the image display screen of the movable display device relative to the standard direction is within a given angle, the image data stored and related with the orientation of the image display screen is output to the standard display device 3 while the output of the change signal is canceled, and is output to the movable display device while the change signal is output.

In this constitution, by setting the angle, which is formed by the orientation of the image display screen of the movable display device relative to the standard direction, within a given angle and by outputting change signal when an image is displayed on the standard display device, the image displayed by the standard display device is displayed by the movable display device.

In the state where the change signal is output, by changing the orientation of the image display screen of the movable display device so that its angle formed relative to the standard direction exceeds a given angle, the orientation of the image display screen stored and related with image data corresponding to the image displayed by the movable display device is changed in the same way. The orientation of the image display screen stored and related with the image data is thereby changed to the orientation of the image display screen of the movable display at the time of the :cancellation of the change signal. As a result, since the display on the standard display device of the image corresponding to that image data is canceled, a different image can be displayed on the standard display device.

It is preferable that a combiner is provided on the movable display device; and the combiner allows transmission of the image display beam from the standard display device so as to guide the beam to a viewer's eyes, and changes the optical path of the image display beam from the movable display device so as to guide the beam to the viewer's eyes.

The image display beam of the standard display device passing through the combiner is guided to a viewer's eyes, whereby the image display screen can be easily positioned so that the angle, which is formed by the orientation of the image display screen of the movable display device relative to the standard direction, becomes within a given angle.

The present invention is preferably provided means for mounting the movable display device on a viewer's head.

The viewer can thereby change the direction from which an image is displayed just by moving his/her head.

It is preferable that the display system of the present invention comprises; a voice input portion; and means for processing voice signals to recognize the voice input from the voice input portion; wherein the image data can be output according to the results of that voice recognition.

A viewer can thereby visualize a desired image just by vocalizing.

The present invention can provide a display system which can conserve space and contribute to the efficiency of a computer processing many tasks, because it can display a plurality of images at the same time without using a large screen display device.

DESCRIPTION OF THE PREFERRED EMBODIMENTS

First embodiment

Below, a first embodiment of the present invention explained with reference to FIGS. 1 and 2.

The image display system 1 shown in the figures comprises a computer 2 for outputting image data, a standard display device 3, and a movable display device 4.

The computer 2 comprises memory for storing a plurality of programs with image data and is connected to an input apparatus 5 such as a keyboard. The computer 2 can concurrently execute a plurality of programs according to input signals from the input apparatus 5, and output image data for each program through the execution thereof.

The standard display device 3 can be constituted of a CRT display, a liquid crystal display, or the like and can be disposed in a certain position.

The movable display device 4 can be carried by a viewer 6 in one hand, and its image display screen can be oriented in an arbitrary direction according to movement of the head of viewer 6.

The movable display device 4 comprises a display unit 10 which emits an image display beam, a substrate 11, a case 12 covering that display urLit 10 and substrate 11, a combiner 13, and an arm 14 connecting the case 12 and combiner 13.

In this embodiment, the display unit 10 comprises a backlight 10a and a liquid crystal panel 10b. The constitution of the display unit 10 is not limited, for example, can comprise a CRT display or the like. The combiner 13 comprises a half mirror, hologram element, or the like. The combiner 13 guides the image display beam, emitted from the image display screen of the liquid crystal panel 10b of the movable display device 4, to the eyes of a viewer 6 by changing the optical path through reflecting or diffracting the beam; the combiner 13 also transmits light from the front at the same time. By placing the movable display device 4 on the side of his/her head, the viewer 6 can thereby see both a region to the front of the combiner 13 and an image formed by the image display beam from the movable display device 4.

A driver 11a for the liquid crystal panel 10b, an orientation sensor 11b for detecting the orientation of the image display screen of the movable display device 4, a change switch 11c, and an ON/OFF switch 11d are provided on the substrate 11 of the movable display device 4. The driver lha, orientation sensor 11b, and switches 11c and 11d are connected to a signal processing circuit 23a provided on a connecting substrate 23 via wiring 20, a connector 21, and a plug 22. The signal processing circuit 23a can comprise a microprocessor.

An interface 23c and memory 23b connected to the signal processing circuit 23a are provided on the connecting substrate 23. The signal processing circuit 23a is connected to a bus line of the computer 2 via the interface 23c and connector 24. The image data output from the computer 2 is stored in the memory 23b via the interface 23c and signal processing circuit 23a. The image data is stored with the orientation of the image display screen of the movable display device 4 so that the image data is related with the orientation. The image data is initially related with the standard direction discussed below.

In this embodiment, the orientation of the image display screen of the movable display device 4 corresponds to the standard direction when the normal direction of the center of the image display screen of the movable display device 4 agrees with the normal direction of the center of the screen of the standard display device 3. The orientation sensor 11b outputs a detection signal corresponding to the orientation of the image display screen of the movable display device 4. The detection signal corresponds to the angle formed by the normal direction of the center of the image display screen of the movable display device 4 relative to the standard direction. The type of orientation sensor 11b is not limited. For example, the orientation sensor 11b can comprise a vibratory gyroscope device, a geomagnetic sensor, an acceleration sensor or the like; or again, a sensor, which has a coil installed on the movable display device 4 and means for generating magnetic fields around that coil, can be used as the orientation sensor 11b, detecting the orientation of the image display screen of the movable display device 4 based on changes of current corresponding to changes of the orientation of the coil in the magnetic field.

The detection signal output from the orientation sensor 11b is input to the computer 2 via the signal processing circuit 23a and interface 23c. The computer 2 determines whether the angle, which is formed by the orientation of the image display screen of the movable display device 4 relative to the standard direction, is within a given angle. That given angle is stored in the computer 2. For example, in a condition where the screen of the standard display device 3 can be seen through the combiner 13, the angle formed by the orientation of the image display screen of the movable display device 4 relative to the standard direction is within the given angle.

In this embodiment, the change switch 11c is a normally open push-button switch. The signal processing circuit 23a outputs a change signal when the contact of the change switch 11c is closed in the state where the contact of the ON/OFF switch 11d is closed. The change signal is input to the computer 2 via the interface 23c. The change signal is not output in the state where the contact of the ON/OFF switch 11d is open.

When the angle formed by the orientation, detected by the orientation sensor 11b, of the image display screen of the movable display device 4 relative to the standard direction is within a given angle, the computer 2 outputs image data stored and related with the orientation of the image display screen to the standard display device 3 while the output of the change signal is canceled, and outputs the image data to the movable display device 4 while the change signal is output. In other words, when the change signal is output and the angle formed by the orientation of the display screen relative to the standard direction is within a given angle, the computer 2 cancels the output of the image data, stored and related with the orientation of the image display screen, to the standard display device 3, at the same time, the computer 2 outputs a command to the signal processing circuit 23a for outputting the image data to the movable display device 4. According to that command for outputting the image data, the signal processing circuit 23a outputs that image data stored in the memory 23b to the driver 11a of the movable display device 4.

When the angle formed by the orientation, detected by the orientation sensor 11b, of the image display screen of the movable display device 4 relative to the standard direction exceeds a given angle, and the contact of the ON/OFF switch 11d is closed, the computer 2 outputs the image data stored and related with the detected orientation of the image display screen to the movable display device 4. In the state where the contact of the ON/OFF switch 11d is open, the image data is not output to the movable display device 4.

The standard display device 3 displays an image corresponding to the sent image data. The combiner 13 transmits the image display beam from the standard display device 3 and guides the beam to the eyes of the viewer 6, whereby the image displayed on the screen of the standard display device 3 can be seen by the viewer 6.

The movable display device 4 displays an image corresponding to the sent image data with the liquid crystal panel 10b. The combiner 13 changes the optical path of the image display beam from the movable display device 4 and guides it to the viewer's eyes, whereby the image displayed on the movable display device 4 can be seen by the viewer 6.

The computer 2 changes the orientation of the image display screen stored and related with the image data in the memory 23b according to the change in orientation of the image display screen of the movable display device 4, when the image data is output to the movable display device 4 and the change signal is output. To be more precise, when the output of the change signal is canceled after the change of the orientation of the image display screen of the movable display device 1 in the state where the change signal is output, the orientation of the image display screen stored and related with the image data is changed to the orientation of the image display screen of the movable display device 4 at the time of the cancellation of the change signal.

Figure 1:
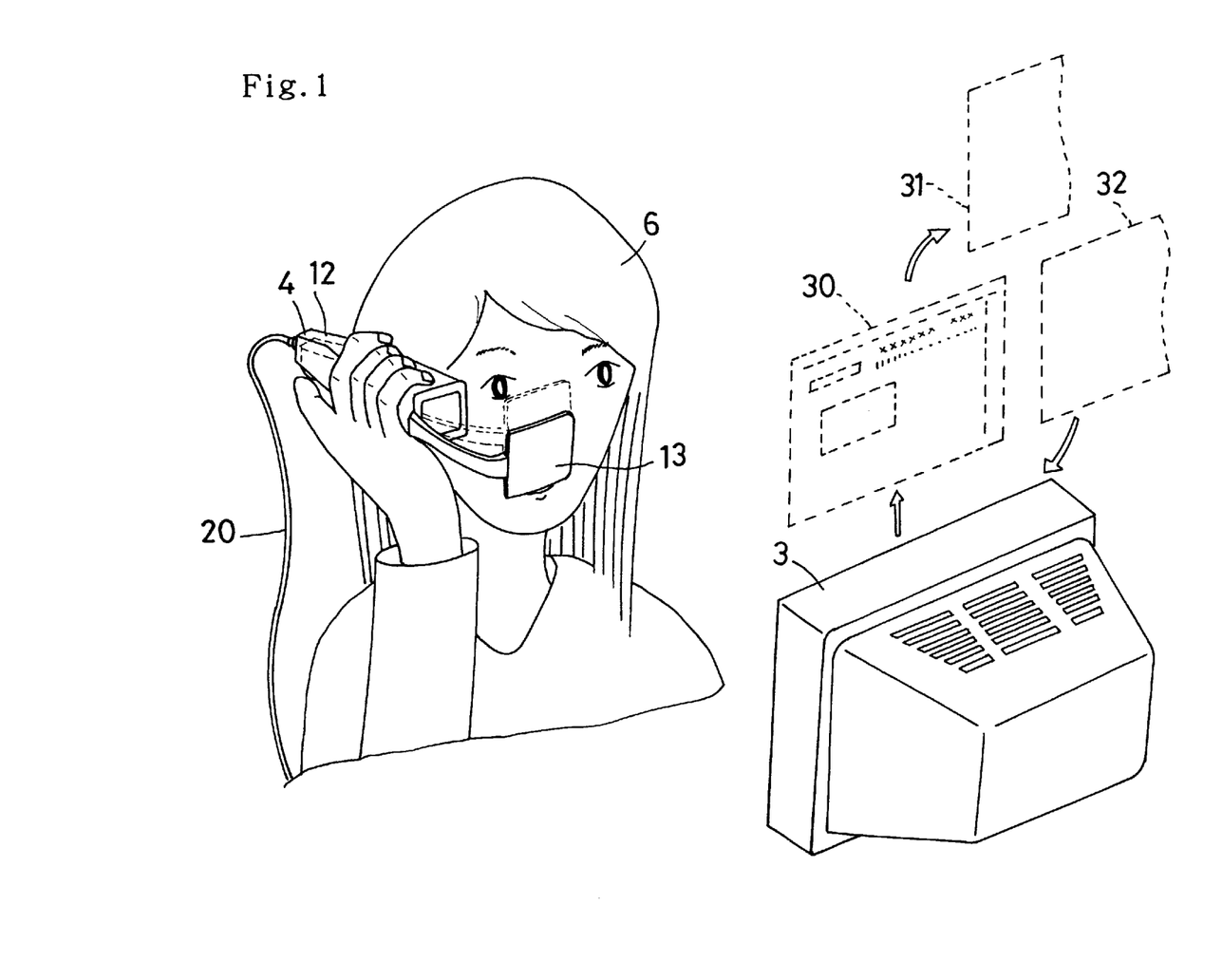
FIG. 1 is a diagram to explain a method of using an image display system which is a first embodiment of the present invention.
Figure 2:
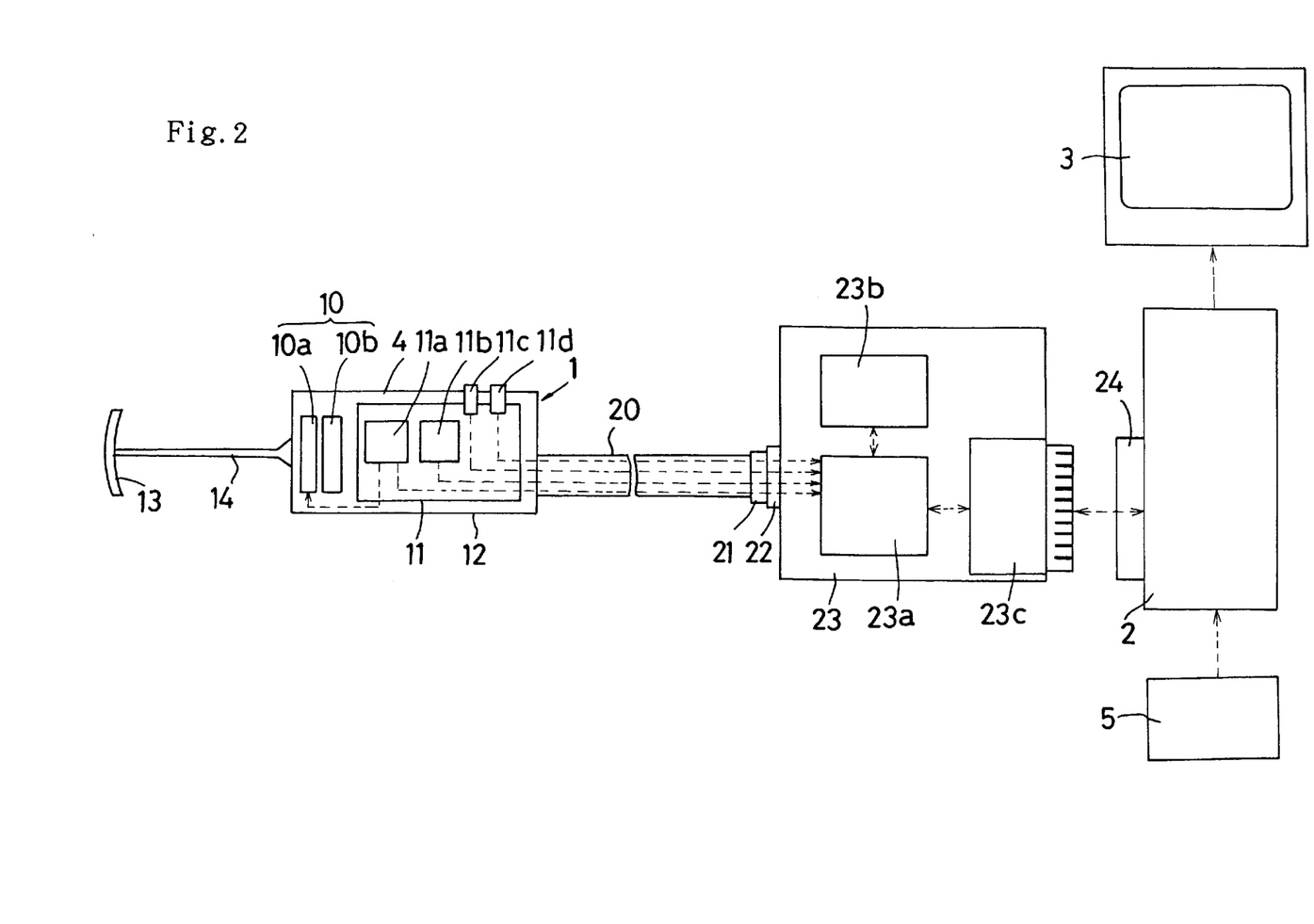
FIG. 2 is a diagram to explain the constitution of an image display system which is a first embodiment of the present invention.

As shown in FIG. 1, when an image is displayed on the standard display device 3, the combiner 13 of the movable display device 4 is placed before the eyes of the viewer 6 and positioned so that the angle formed by the orientation of the image display screen of the movable display device 4 relative to the standard direction is within a given angle. With just the guide of the image display beam from the standard display device 3 passing through the combiner 13 to the eyes of the viewer 6, it is easy to position the movable display device 4 so that the angle formed by the orientation of the image display screen of the movable display device 4 relative to the standard direction is within a given angle. In this situation, when the contact of the ON/OFF switch 11d is closed and the change switch 11c is pressed, a change signal is output. By this output of the change signal, the image displayed by the standard display device 3 is displayed by the movable display device 4, and the display of the image by the standard display device 3 is canceled.

Next, in the state where the change signal is output, the angle formed by the orientation of the image display screen of the movable display device 4 relative to the standard direction is changed from being within a given angle to exceeding a given angle. For example, the orientation of the combiner 13 is moved upwards as shown by the dotted line in FIG. 1. The orientation of the image display screen stored and related with the image data corresponding to the image displayed by the movable display device 4 is thereby changed in the same way. Therefore, the displayed position of the image is changed according to the change in the orientation of the image display screen of the movable display device 4. For example, when the orientation of the combiner 13 is moved upwards as shown by the dotted line in FIG. 1, the displayed position of the image is changed as shown by the dotted line 30 in FIG. 1. The viewer 6 can thereby see the image as if the image were hung in space. When the output of the change signal is canceled, the orientation of the image display screen stored and related with the image data is changed to the orientation of the image display screen of the movable display device 4 at the time of the cancellation of the change signal. Since the display on the standard display device 3 of the image corresponding to that image data is canceled, a different image can be displayed on the standard display device 3.

In a state where the angle formed by the orientation of the image display screen of the movable display device 4 relative to the standard direction exceeds a given angle and the change signal is output, when the orientation of the image display screen of the movable display device 4 is changed, the orientation of the image display screen stored and related with the image data corresponding to the image displayed on the image display screen of the movable display device 4 changes in the same way. In other words, the display position of the image is changed in accordance with the change in the orientation of the image display screen of the movable display device 4. For example, the display position is changed from the position shown by the dotted line 30 to the position shown by the dotted line 31 as shown in FIG. 1. When the output of the change signal is canceled, the orientation of the image display screen stored and related with that image data is changed to the orientation of the image display screen of the movable display device 4 at the time of the cancellation of the change signal. In the state where the change signal is not output, the image corresponding to the image data can be seen only where the orientation of the image display screen stored and related with that image data corresponds to the orientation of the image display screen of the movable display device 4.

The desired image can thereby be displayed on the image display screen oriented in an arbitrary direction. To be more precise, in the state where the change signal is output, the movable display device 4 can display the same image when the image display screen of the movable display device 4 is oriented in one direction and when it is oriented in a different direction. While, in the state where the output of the change signal is canceled, the movable display device 4 can display mutually different images when the image display screen is oriented in one direction and when it is oriented in a different direction. In this way, by displaying images with the movable display device 4, the viewer 6 can see a plurality of images, as if hung in space. For example, the viewer 6 is able to view images corresponding to a word processor program when the image display screen is oriented in one direction and to view images corresponding to a drawing program when it is oriented in a different direction. The viewer 6 can thereby work with viewing a plurality of images corresponding to the desired programs and can change the contents of each image according to the progression of the program.

In the state where the change signal is output, when the angle formed by the orientation of the image display screen of the movable display device 4 relative to the standard direction is changed from being in excess of a given angle to being within a given angle, the orientation of the image display screen stored and related with the image data corresponding to the image displayed by the movable display device 4 changes in the same way. The display position of the image thereby changes according to the change in the orientation of the image display screen of the movable display device 4. For example, the display position changes from the position shown with the dotted line 32 in FIG. 1 to the position overlapping the image display screen of the standard display device 3. In the case where the output of the change signal is canceled, the orientation of the image display screen stored and related with the image data is changed to the orientation of the image display screen of the movable display device 4 at the time of the cancellation of the change signal. The image corresponding to the image data is therefore displayed on the standard display device 3 and the display of the image by the movable display device 4 is canceled. By displaying images in this way with the standard display device 3 and the movable display device 4, a viewer can create a working environment, which is similar to pinning documents up on the walls around a desk with spreading out documents on the desk.

Second embodiment

Figure 3:
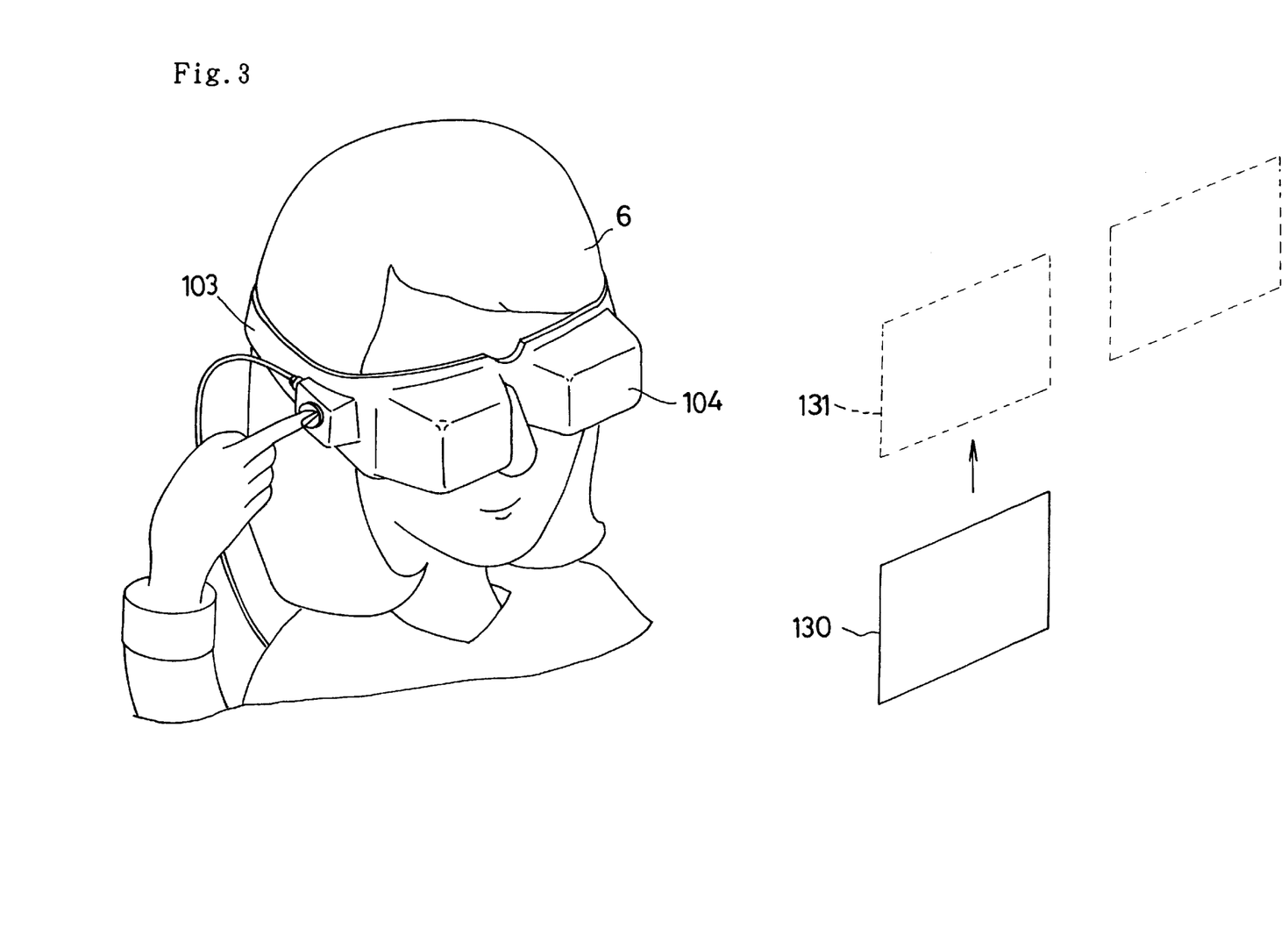
FIG. 3 is a diagram to explain a method of using an image display system which is a second embodiment of the present invention.
Figure 4:
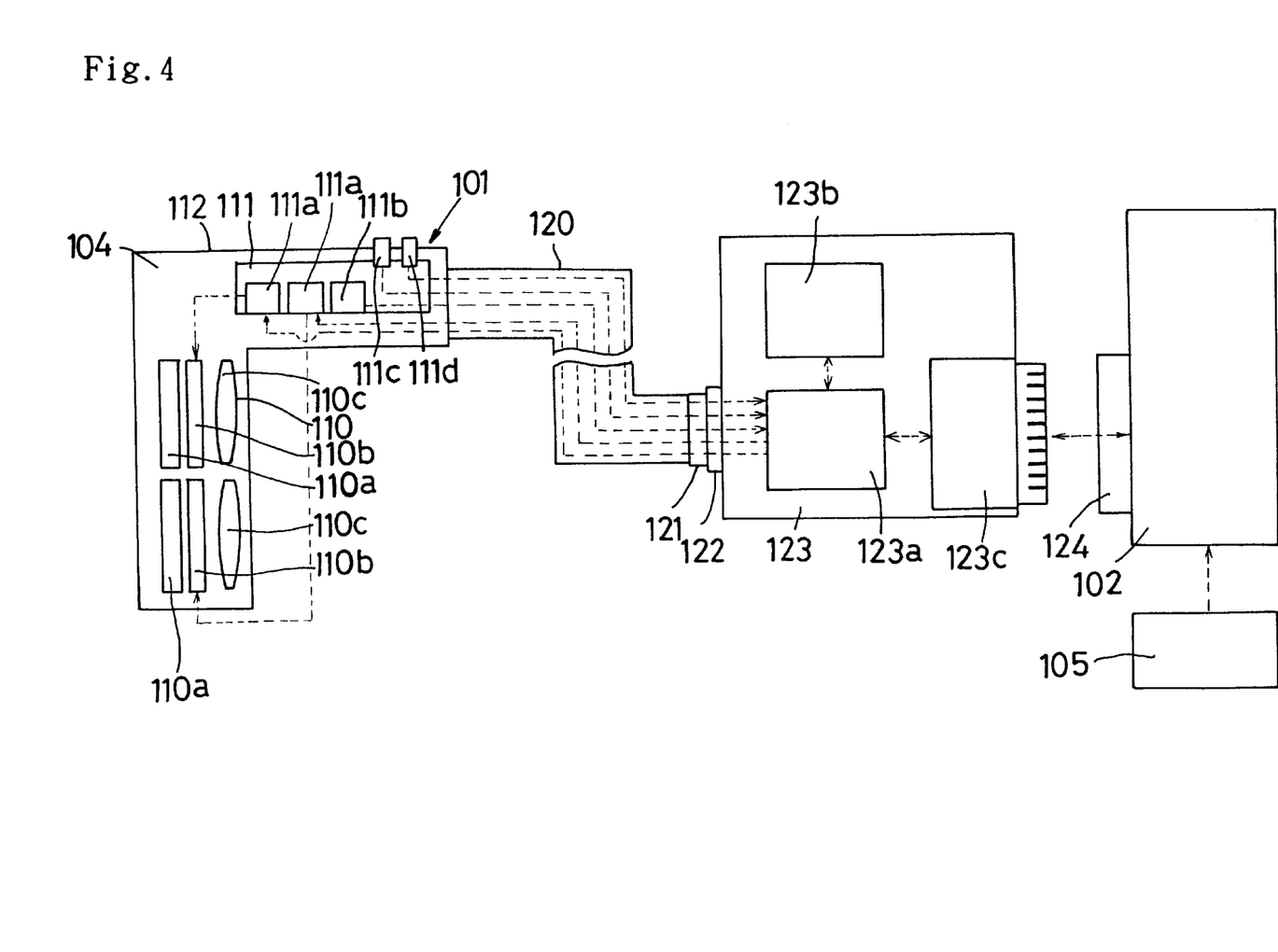
FIG. 4 is a diagram to explain the constitution of an image display system which is a second embodiment of the present invention.

The second embodiment of the present invention is shown in FIGS. 3 and 4.

The image display system 101 shown in the figures comprises a computer 102 for outputting image data and a movable display device 104.

The computer 102 comprises a memory for storing a plurality of programs with image data and is connected to an input apparatus 105 such as a keyboard. The computer 102 can concurrently execute a plurality of programs according to input signals from the input apparatus 105, and output image data for each program through the execution thereof.

As shown in FIG. 3, the movable display device 104 is removably mounted on the head of a viewer 6 by means of a holding portion 103. The viewer 6 can orient the image display screen of the movable display device 104 in an arbitrary direction according to movement of his/her head. The holding portion 103 is in the form of a band. This holding portion is not limited to the form of a band, and could also be a helmet, for example, so long as it can be mounted on the head of a viewer 6.

The movable display device 104 comprises a display unit 110 which emits an image display beam, a substrate 111, and a case 112 covering the display unit 110 and substrate 111.

The display unit 110 comprises a pair of backlights 110a opposite both eyes of the viewer 6, a pair of liquid crystal panels 110b, and a pair of lers systems 110c. The display unit is not limited to the constitution of the present embodiment and, for example, a CRT display can be used instead of the backlights 110a and liquid crystal panels 100b. The image display beam emitted from each liquid crystal panel 100b reaches the eyes of the viewer 6 by means of the lens systems 100c. An image displayed on the image display screen of each liquid crystal panel 100b is thereby formed in front of the viewer 6. The following constitution can also be used instead of this constitution: the display unit is placed on the side of the head of the viewer 6, a combiner is placed in front of the viewer 6, the image display beam emitted from the display unit is guided to the combiner with an optical system, and the combiner changes the optical path of the image display beam so as to guide it to the viewer's 6 eyes. In this case, the viewer 6 can see the region to the front as well as an image formed by the image display beam from the movable display device 104. A display unit guiding the image display beam to only one eye of the viewer 6 can also be used.

A pair of drivers 111a for driving each liquid crystal panel 110b, an orientation sensor 111b for detecting the orientation of the image display screen of the movable display device 104, a change switch 111c, and an ON/OFF switch 111d are provided on the substrate 111 of the movable display device. The drivers 111a, orientation sensor 111b, and switches 111c and hid are connected to the signal processing circuit 123a provided on the connecting substrate 123 via wiring 120, a connector 121, and a plug 122. The signal processing circuit 123 can comprise a microprocessor.

An interface 123c and memory 123b connected to the signal processing circuit 123a are provided on the connecting substrate 123. The signal processing circuit 123a is connected to a bus line of the computer 102 via the interface 123c and connector 124. The image data output from the computer 102 is stored in the memory 123b via the interface 123c and signal processing circuit 123a. The image data is stored with the orientation of the image display screen of the movable display device 104 so that the image data is related with the orientation. The image data stored in the memory 23b is initially related with the standard direction discussed below.

In this embodiment, the standard direction corresponds to the orientation of the image display screen of the movable display device 104 at the time when the contact of the ON/OFF switch 111d changes from an open state to a closed state. The orientation sensor 111b outputs a detection signal corresponding to the orientation of the image display screen of the movable display device 104. The detection signal corresponds to the angle formed by the normal direction of the center of the image display screen of the movable display device 104 relative to the standard direction. The orientation sensor 111b can be the same type as used in the first embodiment.

The detection signal output from the orientation sensor 111b is input to the computer 102 via the signal processing circuit 123a and interface 123c. When the contact of the ON/OFF switch 111d changes from an open state to a closed state, the image data, which is output via the signal processing circuit 123a and interface 123c according to the program, is stored in the memory 123b by the computer 102 so that the image data is related with the standard direction corresponding to the detection signal input from the orientation sensor 111b.

The change switch 111c is a normally open push-button switch. The signal processing circuit 123a outputs a change signal when the contact of the change switch 11c is closed in the state where the contact of the ON/OFF switch 111d is closed. The change signal is input to the computer 102 via the interface 123c. The change signal is not output in the state where the contact of the ON/OFF switch 111d is open.

When the contact of the ON/OFF switch 111d is closed, the computer 102 outputs the image data, stored and related with the orientation of the image display screen of the movable display device 104, to the movable display device 104. In the state where the contact of the ON/OFF switch 111*d* is open, the image data is not output to the movable display device 104. The movable display device 104 displays the image corresponding to the sent image data with the liquid crystal panels 110*b*. The viewer 6 sees the image displayed by the liquid crystal panels 110*b* via the lens system 110*c*.

The computer 102 changes the orientation of the image display screen stored and related with the image data in the memory 123*b*, when the image data is output to the movable display device 104 and the change signal is output, according to the change in orientation of the image display screen of the movable display device 104. Therefore, when the output of the change signal is canceled after the change of the orientation of the image display screen of the movable display device 104 in the state where the change signal is output, the orientation of the image display screen stored and related with the image data is changed to the orientation of the image display screen of the movable display device 104 at the time of the cancellation of the change signal.

With the aforementioned second embodiment, when the ito contact of the ON/OFF switch 111*d* closes in the state where the image display screen of the movable display device 104 is oriented in an arbitrary direction, the image corresponding to the image data output from the computer 102 is displayed by the movable display device 104, and the image data and orientation of the image display screen are stored in the memory 123*b* so that the image data is related with the orientation.

By changing the orientation of the image display screen of the movable display device 104 by moving the head of viewer 6 in the state where the change signal is output, the orientation of the image display screen stored and related with the image data corresponding to the image displayed on the movable display device 104 is changed in the same way. In this case, the display position of the image changes in accordance with the change of the orientation of the image display screen of the movable display device 104. For example, the display position changes from the position shown with the solid line 130 in FIG. 3 to the position shown with the dotted line 131.

In the case where the output of the change signal is canceled, the orientation of the image display screen stored and related with the image data is changed to the orientation of the image display screen at the time of the cancellation of the change signal.

In the state where the change signal is not output, the image corresponding to the image data can be seen only when the orientation of the image display screen stored and related with that image data corresponds to the orientation of the image display screen of the movable display device 104. In this case, the image is thereby moved out of the viewer's 6 field of vision when the viewer moves his/her head to change the orientation of the image display screen of the movable display device 104.

In this way, the desired image can be displayed on the image display screen oriented in an arbitrary direction. To be more precise, in the state where the change signal is output, the same image can be displayed when the image display screen of the movable display device 104 is oriented in one direction and when it is oriented in a different direction. Also, in the state where the output of the change signal is canceled, mutually different images can be displayed when the image display screen is oriented in one direction and when it is oriented in a different direction. Just by moving his/her head, the viewer 6 can thereby see a plurality of images as if hung in space. For example, the viewer 6 is able to view images corresponding to a word processor program when the image display screen is oriented in one direction and to view images corresponding to a drawing program when it is oriented in a different direction. The viewer 6 can thereby work with viewing a plurality of images corresponding to the desired programs, and can change the contents of each image according to the progression of the program.

Third embodiment

Figure 5:
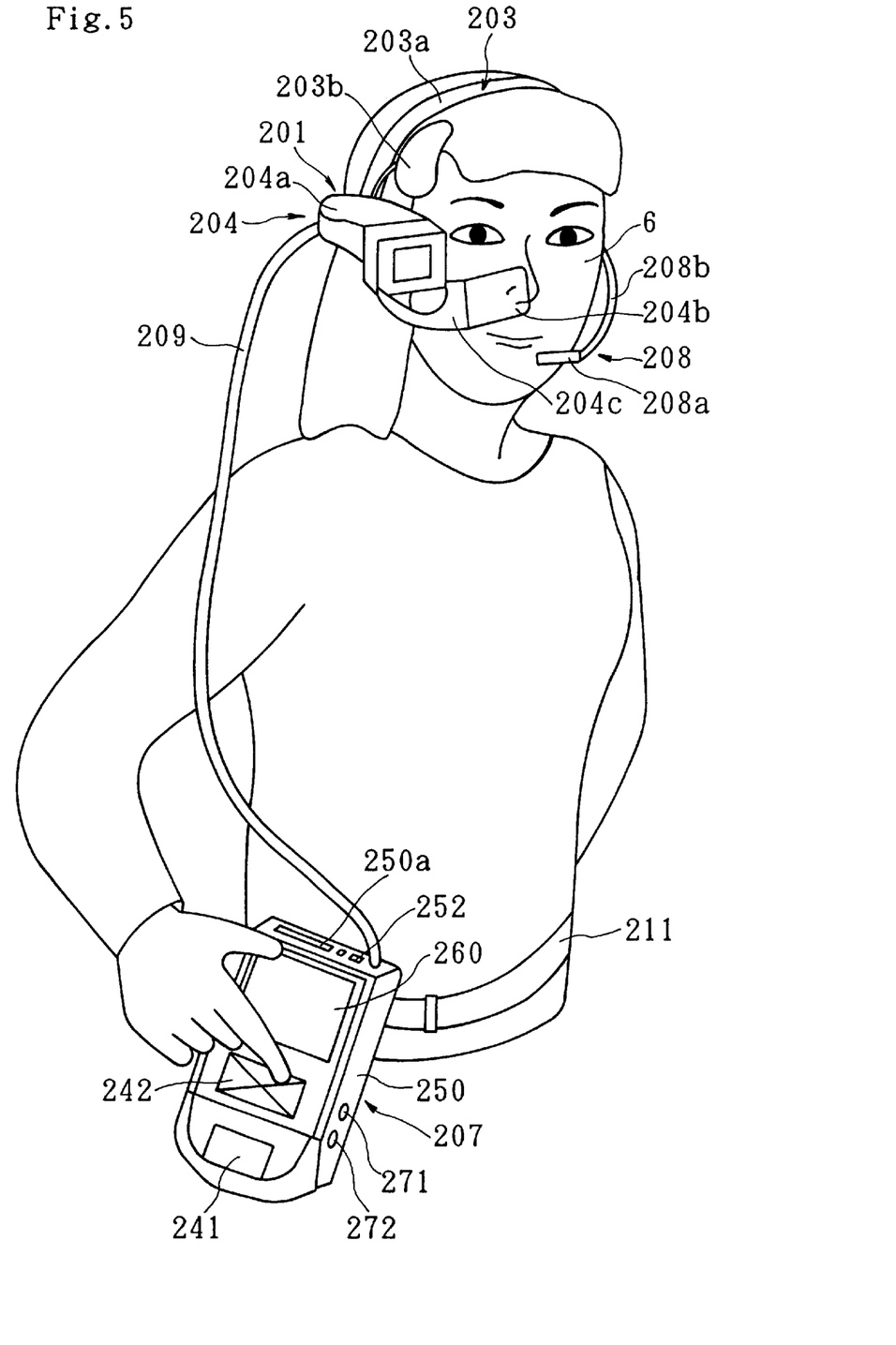
FIG. 5 is a diagram to explain a mode of using an image display system which is a third embodiment of the present invention.
Figure 6:
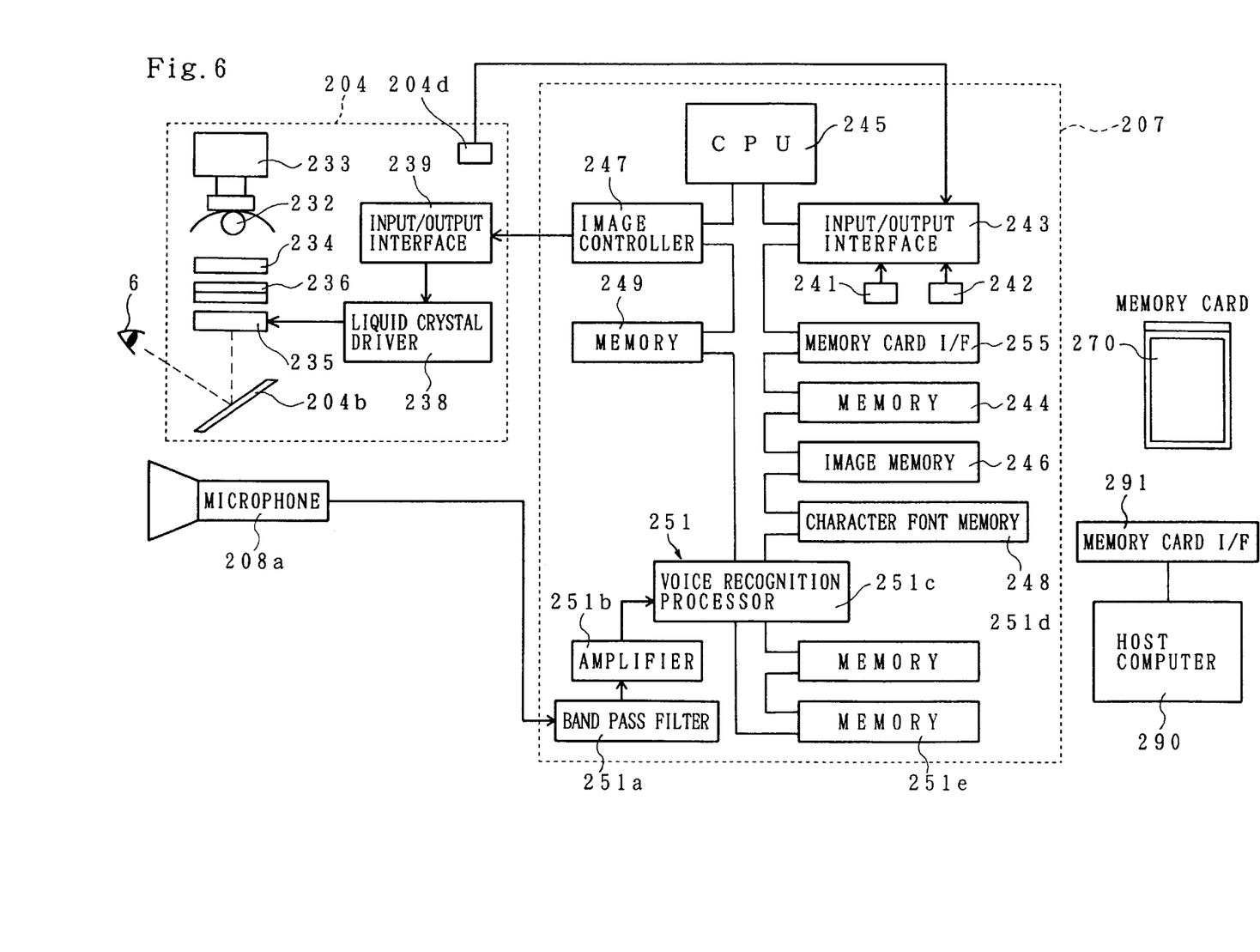
FIG. 6 is a diagram to explain. the constitution of an image display system which is a third embodiment of the present invention.

The third embodiment of the present invention is shown in FIGS. 5 and 6. The present embodiment differs from the aforementioned second embodiment in its use of a display unit which guides the image display beam to only one eye of the viewer 6. Also, the present embodiment comprises a voice input portion and means for processing voice signals for recognizing the voice input, wherein image data is output according to the results of the voice recognition. The differences from the second embodiment are explained below.

The display system 201 shown in FIG. 5 comprises the following: a holding portion 203 able to be mounted on the head of the viewer 6, a movable display device 204 held by this holding portion 203, a control portion 207 able to be worn on the viewer's 6 haunch by means of a belt 211, and a voice input portion 208. In the present embodiment, the movable display device 204 displays image viewed by only one eye of the viewer 6, but a movable display device displaying image viewed both eyes can be used.

The holding portion 203 comprises a band-shaped main body 203*a* for holding the viewer's 6 head by means of elastic force, and a pad 203*b* for pressing the head to prevent slippage of the movable display device 204 in relation to the head. The form of the holding portion 203 is not limited so long as it can be mounted on the head of a viewer 6. For example, the pad 203*b* is not necessary. Also, a helmet-shaped holding body can be used. In the present invention, "head" refers to a portion of the body above the neck and including the face.

The movable display device 204 comprises a display unit 104*a* which emits an image display beam, an optical system 204*b* which changes the optical path of the image display beam and guides it to the field of vision of the viewer 6, and an arm 204*c* connecting the display unit 204*a* and optical system 204*b*. The display unit 204*a* is connected to the control portion 207 by means of a cable 209.

As shown in FIG. 6, the display unit 204*a* comprises the following: a backlight 232 comprising a halogen lamp with reflecting mirror; a voltage regulator 233 for the backlight 232; a heat-absorbing filter 234 for absorbing the heat of the backlight 232; a liquid crystal panel 235; a diffusion panel 236 for uniforming unevenness in the light from the backlight 232 and guiding the light to the liquid crystal panel 235; a liquid crystal driver 238 connected to the liquid crystal panel 235; and an input/output interface 239 connected to the liquid crystal driver 238. The image display beam is emitted from the front surface of the liquid crystal panel 235 as shown with the dotted Line. A CRT display, for example, can be used instead of the liquid crystal panel 235 with backlight 232. A cold-cathode tube, hot-cathode tube, metal halide lamp, or the like can be used as the backlight.

Furthermore, an orientation sensor 204*d* for detecting the orientation of the image display screen of the movable display device 204 is provided in the display unit 204*a*. The orientation sensor 204*d* is connected to the control portion 207 by means of the cable 209 and the input/output interface 243 of the signal processing circuit discussed below. The same type of orientation sensor as in the foregoing embodiment can be used as this orientation sensor 204*d*.

The optical system 204*b* comprises a combiner, such as a half mirror, hologram element, or the like. The combiner forms an image in front of the viewer 6 by changing the optical path through reflecting or diffracting the image display beam,; the combiner also transmits light from the front at the same time. The optical system 204b can also comprise a mirror, or the like, for changing the optical path by completely reflecting the image display beam. The optical system can also include a converging lens system.

The voice input portion 208 comprises a microphone 208a and an arm 208b for connecting this microphone 208a and the holding body 203. This microphone 208a is arranged near the mouth of the viewer 6.

As shown in FIG. 6, the control portion 207 comprises a signal processing circuit housed in a housing 250. The signal processing circuit comprises the following: main memory 244 for storing programs for executing system control; a CPU 245 for executing those programs; image memory 246 for storing image data; memory 248 for storing character fonts; image controller 247 for reading and writing data to the image memory 246 as commanded by the CPU 245; input/output interface 243 connected to the system operating switches 241, 242; memory card interface 255 connected to the memory card 270; and a voice signal processor 251.

Furthermore, the control portion 207 comprises a memory 249 for storing image data to be output to the movable display device 204 with the orientation of the image display screen of the movable display device 204 so that the image data is related with the orientation.

The voice signal processor 251 has the purpose of recognizing the voice input from the voice input portion 208 and comprises the following: a band-pass filter 251a for removing noise included in the voice signal input from the microphone 208a; an amplifier 251b for amplifying the voice signal transmitted through this band-pass filter 251a; a voice recognition processor 251c connected to this amplifier 251b; and a first and second memory 251d, 251e connected to this voice recognition processor 251c. The voice recognition processor 251c comprises an AD converter for digitizing the amplified voice signal and stores the digitized data in the first memory 251d. Digitized data comprising predetermined voice signals are stored in the second memory 251e. The voice recognition processor 251c compares the digital data stored in the first memory 251d with the digital data stored in the second memory 251e, samples digital data corresponding to the data stored in the first memory 251d from the second memory 251e, and sends the sampled digital data as a word corresponding to the voice input to the CPU 245.

In the present embodiment, the voice input function of the voice input portion 208 replaces the input function of the ON/OFF switch 11d, 111d and change switch 11c, 111c in the foregoing embodiments. For example, the viewer 6 effecting voice input by saying "switch on" results in the same state where the contact of the ON/OFF switch 11d, 111d switches from an open to a closed state; the viewer 6 effecting voice input by saying "switch off " results in the same state where the contact of the ON/OFF switch 11d, 111d switches from a closed state to an open state. Also, the viewer 6 effecting voice input by saying "change signal output" results in the change signal being output. The viewer 6 effecting voice input by saying "cancel change signal output" cancels the output of the change signal.

This system can be switched between a manual mode and a voice operated mode as discussed below. In the voice operated mode, digital data corresponding to a word is input by voice input, whereupon the CPU 245 controls the image controller 247 according to the results of voice recognition of that word. In accord with this control, the CPU 245 reads image data and character fonts from the memory 246, 248; relates the image data including the character fonts with the orientation of the image display screen of the movable display device 204 and stores the image data in the memory 249 with the orientation; and outputs the image data stored in the memory 249 to the liquid crystal driver 238 by means of the input/output interface 239. The liquid crystal driver 238 drives the liquid crystal panel 235, so that image, which corresponds to the vocally-input word and image data stored and related with the orientation of the image display screen of the movable display device 204, is displayed. Also, in the same way as in the foregoing embodiments, the orientation of the image display screen stored and related with the image data in the memory 249 can be changed according to the change in the orientation of the image display screen of the movable display device 204, when the image data is output to the movable display device 204 and the change signal is output. With the cancellation of the output of the change signal, the stored image data is related with the orientation of the image display screen of the movable display device 204 at the time of the cancellation of the change signal.

Also, when digital data corresponding to a word for a write command is input, the CPU 245 can write data to the memory card 270 by means of the memory card interface 255. The data written to the memory card 270 can be written to a host computer 290 by means of the memory card interface 291. The data written to the memory card 270 can be processed by the host computer 290.

As shown in FIG. 5, a battery 260 for driving the entire system is mounted replaceably on the housing 250 of the controller 207. Also, a power switch 252, a confirmation button switch 241 and a four-direction button switch 242 which are the aforementioned operating switch, and a socket 250a for removably connecting the aforementioned memory card 270 to the controller 207 are formed on the housing 250. The confirmation button switch 241 and four-direction button switch 242 are installed for manual operation of the system. The signal for switching between the manually operated mode and voice operated mode is input to the CPU 245 by means of the input/output interface 243 by the operation of the switches 241, 242. In the manually operated mode, the CPU 245 stops the functioning of the voice signal processor 251 and executes a program according to an electronic signal sent through the operation of the switches 241, 242 via the input/output interface 243. The four-direction button switch 242 comprises four switch pieces, which can be operated independently, and is used to move the cursor and specify input contents in the display image. The confirmation button switch 241 is used to confirm the input contents specified by the four-direction button switch 242. For example, input contents such as switch on, switch off, change signal output, change signal canceled or the like, are displayed in the display image and the input contents are specified with the movement of the cursor by the operation of the four-direction button switch 242. A buzzer which sounds when the switches 241, 242 are pressed can be installed on the controller 207 or movable display device 204 in order to confirm operation. Connectors 271, 272 for connecting a wireless modem or the like to the input/output interface 243 can be installed on the housing 250, so that the system can be connected to an external computer or the like by means of the wireless modem or the like. Other constitutions, operations, and effects are as in the second embodiment.

Figure 7:
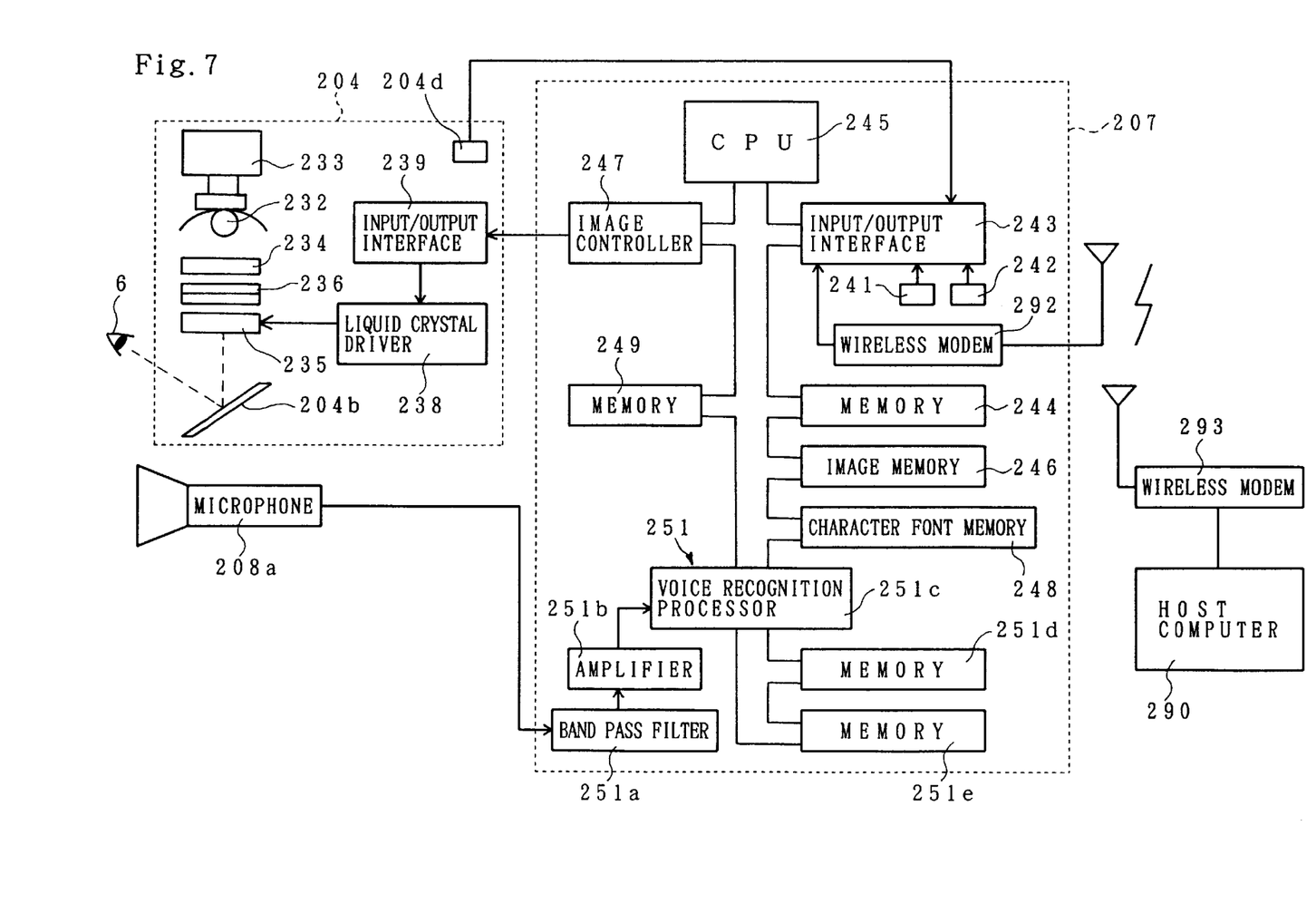
FIG. 7 is a diagram to explain the constitution of a display system which is a variation of the third embodiment of the present invention.

FIG. 7 shows a variation of the third embodiment. Unlike the aforementioned third embodiment, a wireless modem 292 with antenna is connected to the input/output interface 243, instead of a memory card interface 255 and memory card 270, and a wireless modem 293 with antenna is connected to a host computer 290; and the controller 207 and host computer 290 are connected by means of the modems 292, 293. In this case, when digital data corresponding to a word commanding "send" is input, the CPU 245 sends data by means of the input/output interface 243, wireless modems 292, 293 to the host computer 290.

A buzzer can be installed in the aforementioned third embodiment and variation. When data is sent to the memory card 270 and host computer 290 by means of the memory card interface 255 and input/output interface 243, this buzzer sounds at the time of transmission so that data transmission can be confirmed.

Figure 8:
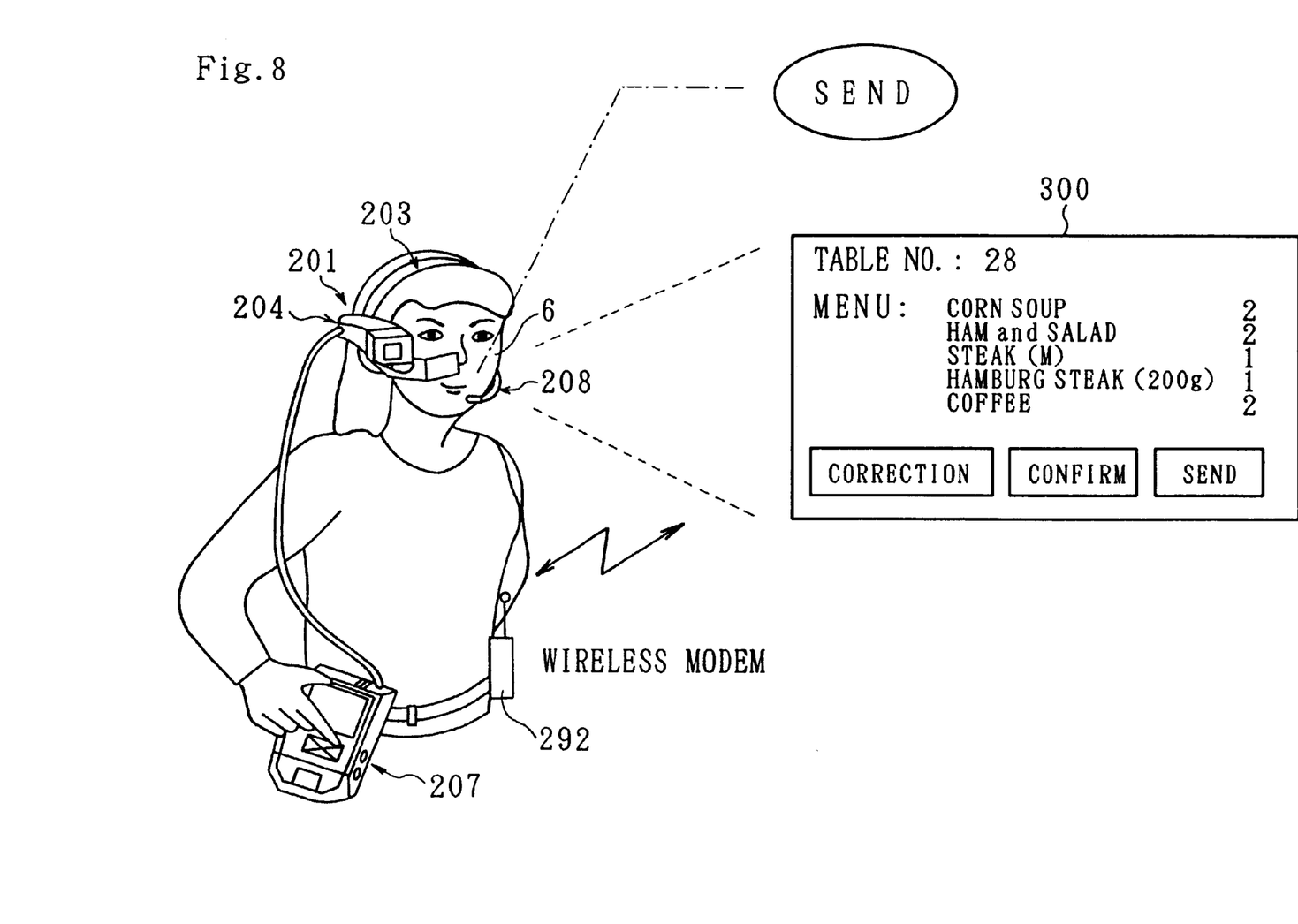
FIG. 8 is a diagram showing a display example of the display system which is a variation of the third embodiment of the present invention.

FIG. 8 shows a specific example of the image 200 displayed by the display system in the variation of the aforementioned third embodiment. Here, the example shown is an example of the system applied to a restaurant's order entry system. Specifically, the waitress or waiter, being the viewer 6, says "switch on" after which he/she vocally inputs the table number of the customer placing the order. The vocally input number is displayed by the movable display device 204. Next, the server repeats the customer's order by vocally inputting the order through the microphone 208a. The vocally input menu is displayed as the order information. When the contents displayed are correct, the viewer 6 effects voice input by saying "send". Whereupon, the CPU 245 sends the order information to the host computer 290 by means of the wireless modems 292, 293. At this time, the system displays a new input screen for the next order at the same time as the transmission of the order information. The host computer 290 provides instructions based on the order information to the kitchen or the like, by means of a network such as a LAN, for example. When the menu information displayed is not correct, the server effects voice input by saying "correction". Whereupon the contents are deleted and it becomes possible to input data again. When the prepared food is taken to the customer, the server effects voice input by saying the table number and then "confirm". The order for that table number is then displayed, allowing the server to confirm that the correct food is being taken to the customer. Also, the change signal is output by the server saying "output change signal"; the display position of the image displayed by the movable display device 204 is changed according to the change in the orientation of the image display screen of the movable display device 204. Also, the output of the change signal is canceled by the server vocally inputting "cancel change signal"; the server can see the image corresponding to the image data only when the orientation of the image display screen, stored and related with the image data, corresponds to the orientation of the image display screen of the movable display device 204. The waitress or waiter can thereby take an order even when both hands are full of plates and easily confirm the order. Also, restaurants can operate more smoothly because it is possible to display empty table information and customer requests.

Instead of a usual microphone 208a in the aforementioned third embodiment and variation, for example, a voice input microphone, which picks up vibrations from the bones of the ear, can be installed in the holding portion 103 so as to be in contact with the side of the head near the bones of the ear. Also, the voice input microphone can be installed on the optical system 204b or arm 204c. Also, the voice input from the voice input microphone can be sent with a voice transceiver to an external computer, and voice signal processing for preparing a voice recognition signal can be executed in the external computer. Also, a printer can be connected to the controller so that the voice input results can be output on paper.

The present invention is not limited to the foregoing embodiments. For example, the image data stored in the memory 23b, 123b does not need to be all the image data output from the computer 2, 102. In other words, only the image data output to the movable display device 4, 104 not oriented in the standard direction is stored in the memory 23b, 123b, and the image data output to the movable display device 4, 104 oriented in the standard direction is stored in the internal memory of the computer 2, 102. Also, the memory 23b, 123b need not be provided, but instead replaced by the internal memory of the computer 2, 102. Also, the movable display device mounted on the head of a viewer as shown in the second embodiment can be used as the movable display device in the first embodiment. Also, the voice input portion and the voice signal processor for recognizing the voice input from the voice input portion, shown in the third embodiment, can be provided in the first and second embodiments; this makes it possible to output image data according to the results of voice recognition.

What is claimed is:

1. A display system comprising:
  a movable display device able to orient its image display screen in an arbitrary direction;
  means for storing image data with an orientation of the image display screen so that the image data is related with the orientation;
  means for detecting the orientation of the image display screen of the movable display device;
  means for outputting the image data to the movable display device so that an image corresponding to the image data is displayed, when the detected orientation of the image display screen corresponds to the orientation of the image display screen stored and related with the image data;
  means for outputting a change signal; and
  means for changing the orientation of the image display screen stored and related with the image data according to the change in orientation of the image display screen of the movable display device, wherein when the image data and the change signal are output, the movable display device continuously displays the image regardless of the orientation of the image and when the change signal is not output, the movable display device displays mutually different images when the image display screen is oriented in one direction and the movable display device is oriented in another direction such that different images having different orientations relative to each other can be displayed so that a viewer can view multiple images with mutually distinct images and orientations simultaneously.

2. The display system according to claim 1, further comprising:
  a standard display device; and
  means for determining whether the angle, which is formed by the orientation of the image display screen of the movable display device relative to a predetermined standard direction, is within a given angle; wherein
  when the angle formed by the orientation of the image display screen of the movable display device relative to the standard direction is within a given angle, the image data stored and related with the orientation of the image display screen is output to the standard display device while the output of the change signal is canceled, and is output to the movable display device while the change signal is output.

3. The display system according to claim 2, wherein:

a combiner is provided on the movable display device; and the combiner allows transmission of the image display beam from the standard display device so as to guide the beam to a viewer's eyes, and changes the optical path of the image display beam from the movable display device so as to guide the beam to the viewer's eyes.

4. The display system according to claim 1, further comprising:

means for mounting the movable display device on a viewer's head.

5. The display system according to claim 2, further comprising:

means for mounting the movable display device on a viewer's head.

6. The display system according to claim 3, further comprising:

means for mounting the movable display device on the viewer's head.

7. The display system according to any one of claims 1 through 6, further comprising:

a voice input portion; and means for processing voice signals to recognize the voice input from the voice input portion; wherein the image data can be output according to the results of the voice recognition.

\* \* \* \* \*